(12) United States Patent
Hwang et al.

(10) Patent No.: US 10,693,328 B2
(45) Date of Patent: Jun. 23, 2020

(54) WIRELESS POWER TRANSFER STANDARD SELECTOR OF POWER RECEIVING UNIT AND METHOD THEREFOR

(71) Applicant: MAPS, INC., Yongin-si (KR)

(72) Inventors: Jong Tae Hwang, Seoul (KR); Dong Su Lee, Dongducheon-si (KR); Jong Hoon Lee, Seongnam-si (KR); Ki Woong Jin, Anyang-si (KR); Hyun Ick Shin, Seoul (KR); Joon Rhee, Seoul (KR)

(73) Assignee: MAPS, INC., Yongin-si (KR)

( * ) Notice: Subject to any disclaimer, the term of this patent is extended or adjusted under 35 U.S.C. 154(b) by 134 days.

(21) Appl. No.: 15/769,196

(22) PCT Filed: Dec. 2, 2016

(86) PCT No.: PCT/KR2016/014126
§ 371 (c)(1),
(2) Date: Apr. 18, 2018

(87) PCT Pub. No.: WO2017/099432
PCT Pub. Date: Jun. 15, 2017

(65) Prior Publication Data
US 2018/0309328 A1  Oct. 25, 2018

(30) Foreign Application Priority Data

Dec. 8, 2015 (KR) .................. 10-2015-0174293

(51) Int. Cl.
*H01F 27/42* (2006.01)
*H01F 37/00* (2006.01)
(Continued)

(52) U.S. Cl.
CPC .............. *H02J 50/80* (2016.02); *H02J 7/025* (2013.01); *H02J 50/12* (2016.02); *H02J 50/20* (2016.02); *H04B 5/0037* (2013.01)

(58) Field of Classification Search
CPC .. H02J 50/80; H02J 50/12; H02J 7/025; H02J 50/20; H02J 17/00; H02J 5/005; H04B 5/0037
See application file for complete search history.

(56) References Cited

U.S. PATENT DOCUMENTS

| 9,577,460 | B2 | 2/2017 | Park |
| 9,866,281 | B2 | 1/2018 | Won et al. |

(Continued)

FOREIGN PATENT DOCUMENTS

| JP | 2007-150565 A | 6/2007 |
| JP | 2012-165602 A | 8/2012 |

(Continued)

OTHER PUBLICATIONS

Korean Office Action dated Dec. 19, 2016, in corresponding Korean Application No. 10-2015-0174293 (5 pages, in Korean).

(Continued)

*Primary Examiner* — Rexford N Barnie
*Assistant Examiner* — Rasem Mourad
(74) *Attorney, Agent, or Firm* — NSIP Law

(57) ABSTRACT

A wireless power transfer standard selector of a power receiving device and a method therefor are disclosed. A wireless power transfer standard selector according to one embodiment comprises: a frequency sensor for sensing an input frequency of a rectifier; a boot attempt counter for counting and storing the number of bootings in which an output voltage of a power converter is generated and then disappears; and a selection unit for selecting a wireless power transfer standard method by using the input frequency (Continued)

sensed through the frequency sensor and/or the number of bootings counted through the boot attempt counter.

8 Claims, 6 Drawing Sheets

(51) Int. Cl.
    *H01F 38/00*     (2006.01)
    *H02J 50/80*     (2016.01)
    *H02J 50/12*     (2016.01)
    *H02J 50/20*     (2016.01)
    *H02J 7/02*     (2016.01)
    *H04B 5/00*     (2006.01)

(56) References Cited

U.S. PATENT DOCUMENTS

| | | | | |
|---|---|---|---|---|
| 2014/0035391 A1* | 2/2014 | Kitani | ............... | H02J 5/005 |
| | | | | 307/104 |
| 2014/0139034 A1* | 5/2014 | Sankar | ............... | H02J 7/025 |
| | | | | 307/104 |
| 2014/0306654 A1* | 10/2014 | Partovi | ............... | H02J 7/025 |
| | | | | 320/108 |
| 2014/0312833 A1 | 10/2014 | Won et al. | | |
| 2015/0115878 A1 | 4/2015 | Park | | |
| 2015/0340877 A1* | 11/2015 | Lin | ............... | H02J 7/025 |
| | | | | 307/104 |
| 2016/0065005 A1 | 3/2016 | Won et al. | | |
| 2016/0087686 A1 | 3/2016 | Won et al. | | |
| 2016/0190818 A1* | 6/2016 | He | ............... | H02J 50/10 |
| | | | | 307/104 |

FOREIGN PATENT DOCUMENTS

| | | |
|---|---|---|
| JP | 2015-89035 A | 5/2015 |
| KR | 10-2014-0066068 A | 5/2014 |
| KR | 10-2014-0124707 A | 10/2014 |
| KR | 10-2014-0124709 A | 10/2014 |
| KR | 10-2015-0050027 A | 5/2015 |

OTHER PUBLICATIONS

International Search Report dated Feb. 27, 2017, in corresponding International Application No. PCT/KR2016/014126 (2 pages in English, 3 pages in Korean).

Korean Office Action dated Jun. 26, 2017, in corresponding Korean Application No. 10-2015-0174293 (2 pages, in English).

* cited by examiner

WIRELESS POWER TRANSFER STANDARD SELECTOR OF POWER RECEIVING UNIT AND METHOD THEREFOR

CROSS REFERENCE TO RELATED APPLICATION(S)

This application is a U.S. National Stage Application of International Application No. PCT/KR2016/014126, filed on Dec. 2, 2016, which claims the benefit under 35 USC 119(a) and 365(b) of Korean Patent Application No. 10-2015-0174293, filed on Dec. 8, 2015, in the Korean Intellectual Property Office.

TECHNICAL FIELD

The present invention relates to a technology for communication management and service, and more specifically, a wireless power transfer technology.

BACKGROUND ART

Power transfer between a power transmitting unit (PTU) and a power receiving unit (PRU) having the same wireless power transfer (WPT) standard protocols is smoothly performed. However, power transfer between a PTU and a PRU having different standard protocols is not performed.

Examples of the wireless transfer standard may include a Qi method owned by the Wireless Power Consortium (hereinafter, referred to as WPC), a Power Matters Alliance (PMA) method, and an Alliance for Wireless Power (hereinafter, referred to as A4WP) method. Since the Qi, PMA, and A4WP methods have different communication protocols, and when a standardized communication is not established between a PTU and PRU, the PTU stops transferring power, and thus power transfer is not possible.

Technical Problem

The present invention is directed to providing a wireless power transfer standard selector of a power receiving unit (PRU) capable of performing a smooth communication between a power transmitting unit (PTU) and a PRU regardless of a wireless power transfer standard method being used by a PTU by distinguishing various wireless power transfer standards, and a method thereof.

Technical Solution

One aspect of the present invention provides a wireless power transfer standard selector including: a frequency detector configured to detect an input frequency of a rectifier; a booting trial counter configured to count a number of booting times in which an output voltage of a power conversion unit is generated and disappears and to store the counted number of booting times; and a selector configured to select a wireless power transfer standard method by using at least one of the input frequency detected by the frequency detector and the number of booting times counted by the booting trial counter.

The frequency detector may include a high frequency detector configured to detect a rectifier input frequency of a high frequency; and a low frequency detector configured to detect a rectifier input frequency of a low frequency.

The booting trial counter may store the number of booting times for a predetermined period of time even after the output voltage disappears.

The selector may select an Alliance for Wireless Power (AW4P) protocol as a protocol for communication with a wireless power transmitting unit when the detected input frequency of the rectifier is greater than or equal to 6.78 MHz.

The selector may select a Power Matters Alliance (PMA) type 1 protocol as a protocol for communication with a wireless power transmitting unit when the frequency detected by the frequency detector is greater than or equal to 200 kHz or less than 6.78 MHz.

The selector may be configured to: primarily select a Qi protocol or a PMA type 2 protocol as a protocol for communication with a wireless power transmitting unit when the detected input frequency of the rectifier is less than or equal to 200 kHz; in response to selecting the Qi protocol in the primary selection, finally select the Qi protocol when the number of booting times is one, and finally select the PMA type 2 protocol when the number of booting times is two; and in response to selecting the PMA type 2 protocol in the primary selection, finally select the PMA type 2 protocol when the number of booting times is one, and finally select the Qi protocol when the number of booting times is two.

The selector may be configured to: primarily select a Qi protocol as a protocol for communication with a wireless power transmitting unit when the frequency detected by the frequency detector is less than or equal to 200 kHz and the number of booting times is one and finally select the Qi protocol when a communication primarily initiated through the Qi protocol succeeds, and finally select a PMA type 2 protocol when a communication primarily initiated through the Qi protocol fails and a rebooting is performed.

The booting trial counter may include: a transistor having a gate provided with an inversion signal of a status signal, which informs the power receiving unit is normally operated by an output voltage of the power conversion unit, a source provided with an output voltage signal, and a drain to which a second resistor is connected; the second resistor formed between a ground voltage and the transistor; a capacitor connected to an output voltage node to charge or discharge a voltage flowing through the output voltage node; a diode located between the output voltage node and the capacitor such that an output voltage flows to the capacitor; a first resistor and a first capacitor that are connected to a node formed between the diode and the capacitor; a first inverter connected to the first resistor and the first capacitor; a second inverter configured to generate a reset signal by receiving an output signal of the first inverter; an AND logic circuit configured to receive an inverted high frequency detection signal, receive a signal generated from a node between the transistor and the second resistor, and perform an AND operation on the inverted high frequency detection signal and the signal generated from the node; and a first D flipflop configured to be reset by the reset signal of the second inverter and output a rebooting output signal by receiving a clock signal generated from the AND logic circuit.

The selector may include: a delay configured to receive an inverted high frequency detection signal from the frequency detector and delay the inverted high frequency detection signal; an XOR logic circuit configured to receive a rebooting output signal from the booting trial counter and a low frequency detection signal from the frequency detector and perform an XOR operation on the received rebooting output signal and the received low frequency detection signal; a second D flipflop configured to receive an output signal of the delay as a clock signal and an output signal of the XOR logic circuit as a data signal and generate an output signal;

a first circuit configured to check the output signal of the second D flipflop and select a PMA protocol or a Qi protocol; and a second circuit configured to receive and confirm a high frequency signal from the frequency detector and select the A4WP protocol.

Advantageous Effects

According to an embodiment, a power receiving unit (PRU) can perform smooth communication by identifying a wireless power transfer standard method regardless of a variety of wireless power transfer standards for a power transmitting unit (PTU). In particular, when a PTU uses a Qi method, a Power Matters Alliance (PMA) type 1 method, and an Alliance for Wireless Power (A4WP) method, the PRU can successfully communicate in a single attempt.

MODES OF THE INVENTION

Hereinafter, embodiments of the present invention will be described in detail with reference to the accompanying drawings. In the description of the embodiments, the detailed description of related known functions or constructions will be omitted herein to avoid making the subject matter of the present invention unclear. In addition, terms which will be described below are defined in consideration to functions in the embodiments of the present invention and may vary with an intention of a user, an operator, or a custom. Accordingly, the definition of the terms should be determined based on overall contents of the specification.

Figure 1:
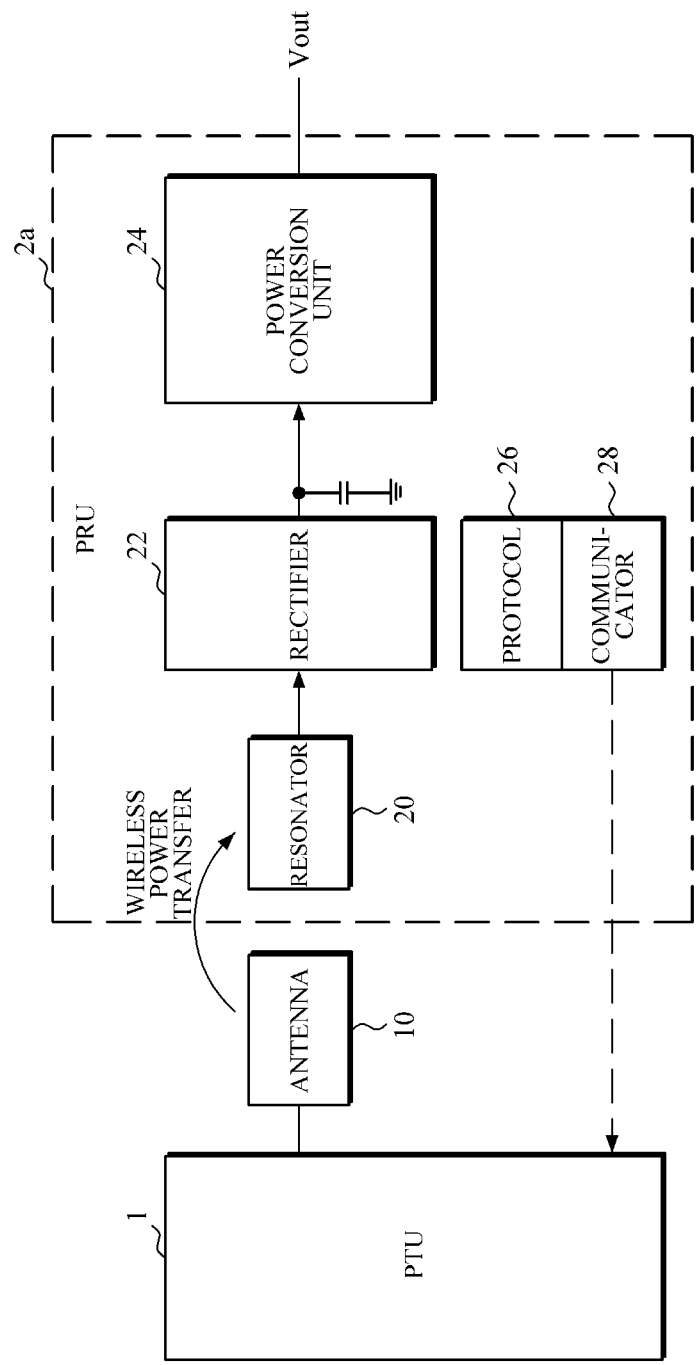
FIG. 1 is a block diagram illustrating a general wireless charging system.

FIG. 1 is a block diagram illustrating a general wireless charging system.

Referring to FIG. 1, the general wireless charging system includes a power transmitting unit (PTU) 1 and a power receiving unit (PRU) 2a. The PRU 2a includes a resonator 20, a rectifier 22, a power conversion unit 24, and a communicator 28.

The PTU 1 transmits power in a wireless manner through an antenna 10. A frequency at which the antenna 10 operates may vary according to the wireless power transfer (WPT) standard. The resonator 20 of the PRU 2a is composed of a LC resonance circuit including an antenna (L) and a capacitor (C) to be resonated at a frequency similar to a frequency of power transmitted by the PTU 1. An output of the resonator 20 is provided in the form of an alternating current (AC) signal, and the signal is converted to a direct current (DC) voltage by the rectifier 22. The power conversion unit 24 receives the voltage and generates a desired output voltage Vout. The power conversion unit 24 may be a DC-to-DC converter, a low drop-out regulator (LDO), or the like.

There are various types of wireless power transfer standards. As an example, a Qi method owned by the Wireless Power Consortium (hereinafter, referred to as WPC) and a Power Matters Alliance (PMA) method exist. As another example, an Alliance for Wireless Power (A4WP) method exists. Each method has a unique protocol 26 for communicating with the PTU 1 to control power of the PRU 2a. Upon receiving wireless power to start operation of the PRU 2a, the PRU 2a communicates with the PTU 1 through the communicator 28 on the basis of the respective protocols 26. In this case, the respective protocols 26 are not compatible with each other, and when the protocols 26 do not match between the PRU 2a and the PTU 1, the PTU 1 stops supplying power.

Figure 2:
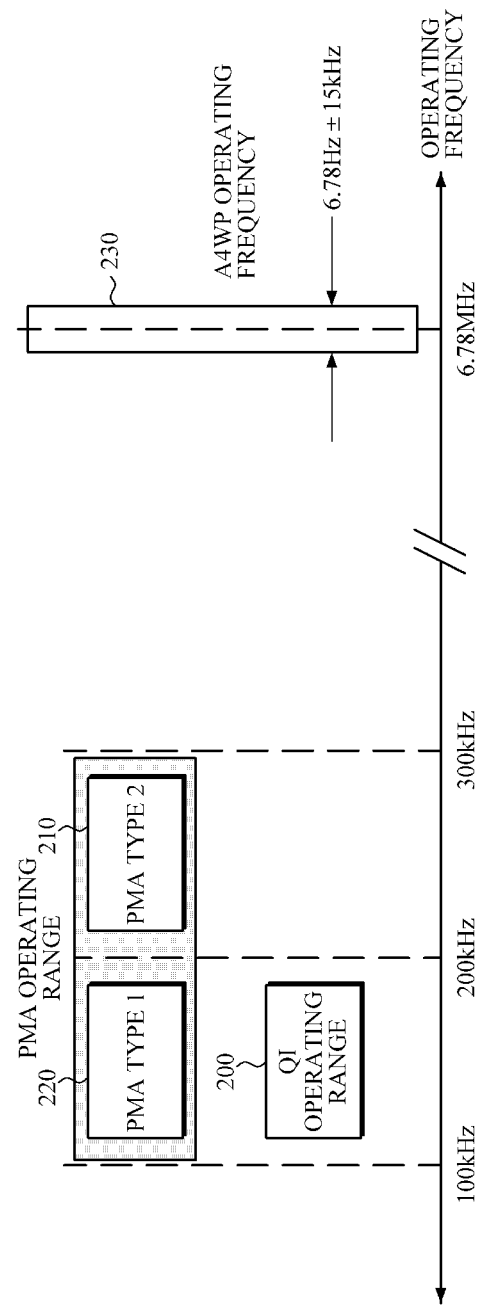
FIG. 2 is a reference diagram illustrating wireless power transfer frequency ranges of wireless power transfer standards.

FIG. 2 is a reference diagram illustrating wireless power transfer frequency ranges of the respective wireless power transfer standards.

Referring to FIG. 2, a Qi method 200 adjusts the power transfer intensity while switching a frequency in a range of 100 kHz to 200 kHz. A PMA method is divided into a PMA type 1 210 and a PMA type 2 220, and in a state that the protocol is identified and a normal operation is performed, the PMA type 1 210 uses a frequency in a range of 227 kHz to 278 kHz, and the PMA type 2 220 uses a frequency in a range of 115 kHz to 150 kHz. Meanwhile, an A4WP method 230 uses a fixed frequency of 6.78 MHz and requires a frequency accuracy within ±15 kHz.

Figure 3:
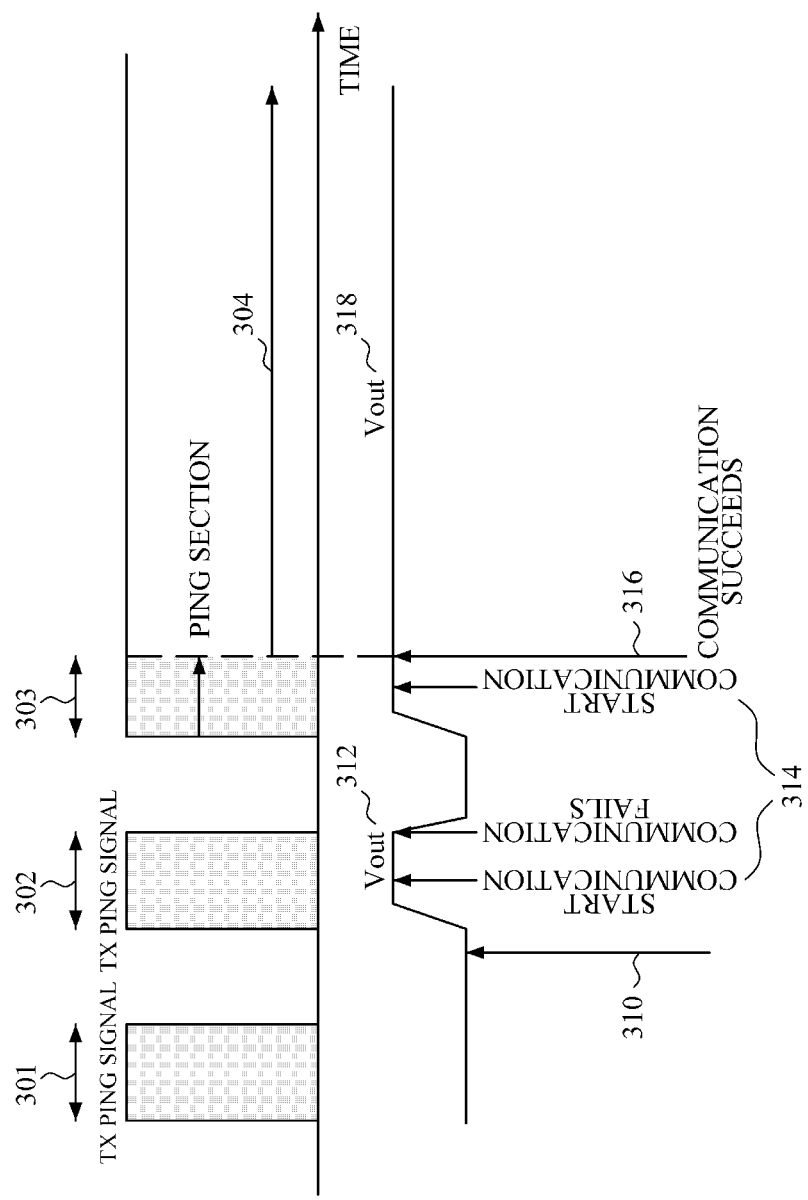
FIG. 3 is a signal timing diagram in a ping or beacon mode and a continuous mode during power transfer.

FIG. 3 is a signal timing diagram in a ping or beacon mode and a continuous mode during power transfer.

Referring to FIG. 3, protocols of the respective wireless power transfer standards are different from each other, but operate in a similar way. For example, the PTU intermittently transfers sections 301, 302, and 303 that are referred to as ping or beacon. In FIG. 3, it is assumed that the PRU is placed on the PTU in the second ping section 302. The PRU receives power during the second ping section 302 and generates an output voltage Vout (312). When the output voltage Vout ensuring a normal operation of the PRU is generated, the PRU starts communication on the basis of the protocol (314). When the communication succeeds during the ping sections 301, 302, and 303 (316), the PTU enters a continuous mode in which the PTU may continuously transfer power to the PRU (304). Since the PRU may also continuously receive power, the output voltage Vout is kept constantly while the power is being received (318), and stable power is supplied to a load. However, when the communication fails during the ping sections 301, 302, and 303 (316), the PTU does not enter the continuous mode, and when the ping sections 301, 302, and 303 are passed, the received power disappears and the output voltage Vout decreases to 0 V.

Figure 4:
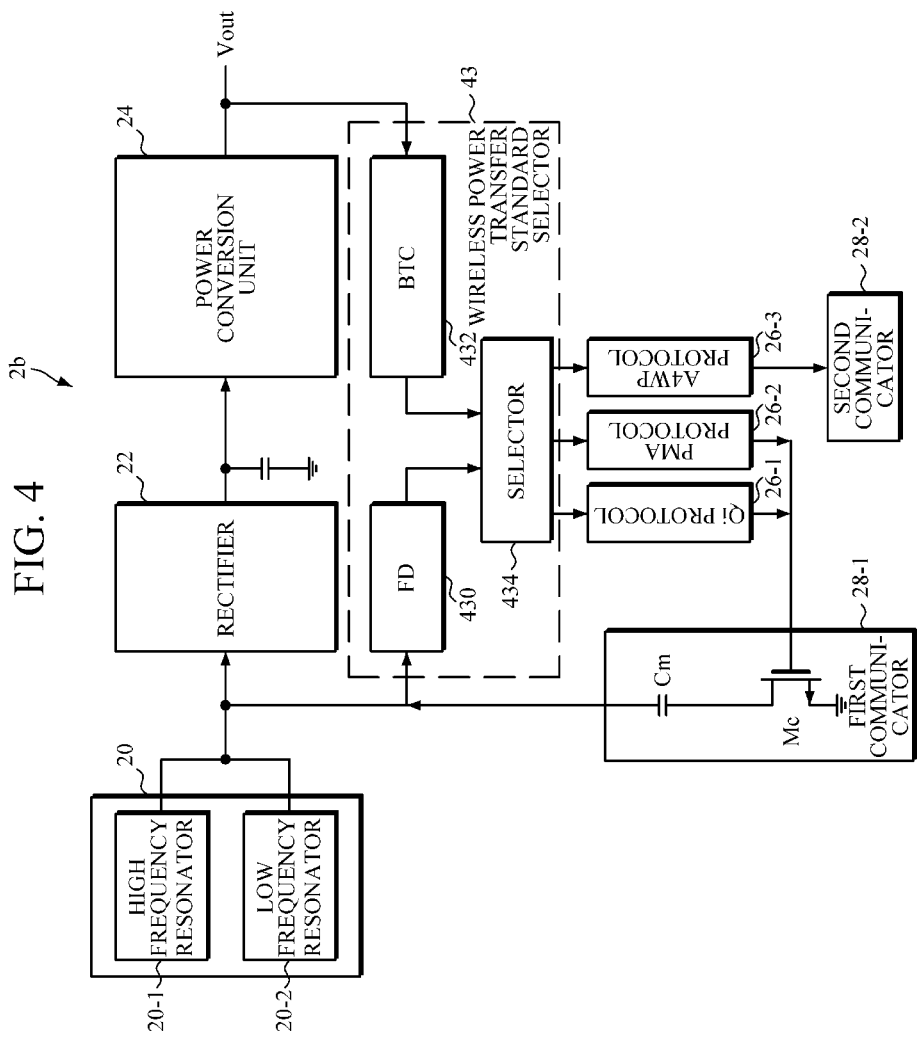
FIG. 4 is a block diagram illustrating a power receiving unit (PRU) including a wireless power transfer standard selector according to an embodiment of the present invention.

FIG. 4 is a block diagram illustrating a PRU including a wireless power transfer standard selector according to an embodiment of the present invention.

Referring to FIG. 4, a single PRU 2b supports a plurality of wireless power transfer standards, and may thus receive wireless power transferred from a PTU using a wireless power transfer standard of which is different from that of the PRU 2b.

The PRU 2b according to the embodiment includes a resonator 20, a rectifier 22, a power conversion unit 24, a Qi protocol 26-1, a PMA protocol 26-2, an A4WP protocol 26-3, a first communicator 28-1, a second communicator 28-2, and a wireless power transfer standard selector 43.

The resonator 20 according to the embodiment includes a high frequency resonator 20-1 and a low frequency resonator 20-2. The Qi method and the PMA method use low frequency signals in a range of 100 kHz to 300 kHz, and the A4WP method uses high frequency signals of 6.78 MHz. Accordingly, the high frequency resonator 20-1 and the low frequency resonator 20-2 are provided to receive wireless energy in different frequency ranges. The rectifier 22 converts an AC signal generated from each of the resonators 20-1 and 20-2 to a DC signal (unregulated DC output), and the power conversion unit 24 receives the DC signal from the rectifier 22 and generates an output voltage Vout (regulated DC output).

Since the PTU uses one of the Qi, PMA, and A4WP methods, the PRU 2b is provided with the Qi protocol 26-1, the PMA protocol 26-2, and the A4WP protocol 26-3, and the wireless power transfer standard selector 43 selects one of the above-described protocols which is suitable. When the Qi method or the PMA method is selected by the wireless power transfer standard selector 43 as the wireless power transfer method, the multi-standard PRU 2b communicates with the PTU through the first communicator 28-1. The first communicator 28-1 is composed of a capacitor Cm and a switch Mc. When the A4WP method is selected, the PRU 2b communicates with the PTU through the second communicator 28-2. The second communicator 28-2 may communicate with the PTU at a frequency of 2.4 GHz using Bluetooth. The first communicator 28-1 uses an in-band communication method, and the second communicator 28-2 uses an out-of-band communication method. The in-band communication method refers to a communication established on the same band/channel/port/connection, and the out-of-band communication method refers to a communication established on a different band/channel/port/connection.

Since the A4WP method has an operating frequency significantly different from those of the Qi method and the PMA method, the A4WP protocol is simply identified, but the Qi method and the PMA method, which use similar frequency bands, are difficult to distinguish from each other.

The wireless power transfer standard selector 43 according to the embodiment includes a frequency detector (hereinafter, referred to an FD) 430, a booting trial counter (BTC) 432, and a selector 434.

The FD 430 detects an input frequency fin of the rectifier 22. The BTC 432 counts the number of booting times in which an output voltage Vout of the power conversion unit 24 is generated and disappears, and stores the counted number. The BTC 432 may store the number of booting times for a predetermined period of time even after the output voltage Vout disappears. The selector 434 selects the wireless power transfer standard method using at least one of the input frequency detected by the FD 430 and the number of booting times counted by the BTC 432.

The selector 434 may determine the Qi method and the PMA method, by simply using the number of booting numbers in which the output voltage Vout is generated and disappears. As described above with reference to FIG. 3, when the protocol does not match in the ping section and a communication is not established, the PTU may not enter the continuous mode, and thus power transfer is stopped and the output voltage Vout disappears. Accordingly, when the selector 434 selects the Qi protocol at first but the PRU 2b is placed on a PMA PTU, the output voltage Vout is generated during the ping section and disappears. When the output voltage Vout normally generated is referred to as succeeding in a booting, a normal protocol has the number of booting times of one. However, when the booting fails due to the protocol being unmatched, a rebooting is needed and thus the number of booting times is two. In the case of a communication attempt with the Qi protocol, two instances of booting represents that the second attempt is made due to a failure of the first attempt. Accordingly, the selector 434 switches the protocol to the PMA protocol 26-2 to attempt a communication. In this process, the selector 434 may select the Qi protocol and the PMA protocol. However, the above described method has a 50% chance that a connection to the PTU is established in a single attempt.

In order to communicate with the PTU in a single attempt if possible, the selector 434 according to the embodiment uses the rectifier input frequency fin when selecting the protocol. When the number of booting times is one and the detected frequency is less than or equal to 200 kHz, it is highly likely to be the Qi and the PMA type 2. In this case, the selector 434 selects the Qi protocol 26-1 and attempts a communication with the PTU. When a communication is not established and a rebooting is performed, the number of booting times is counted as two, and in this case, it is highly likely to be the PMA type 2 and thus the selector 434 selects the PMA protocol 26-2. Since the PMA type 1 has an operating frequency greater than or equal to 200 kHz, the communication may be established in a single attempt similar to the Qi. Such an operation requires that the BTC 432 may store the number of booting times even when the output voltage Vout disappears and the FD 430 may detect the frequency ranges.

Figure 5:
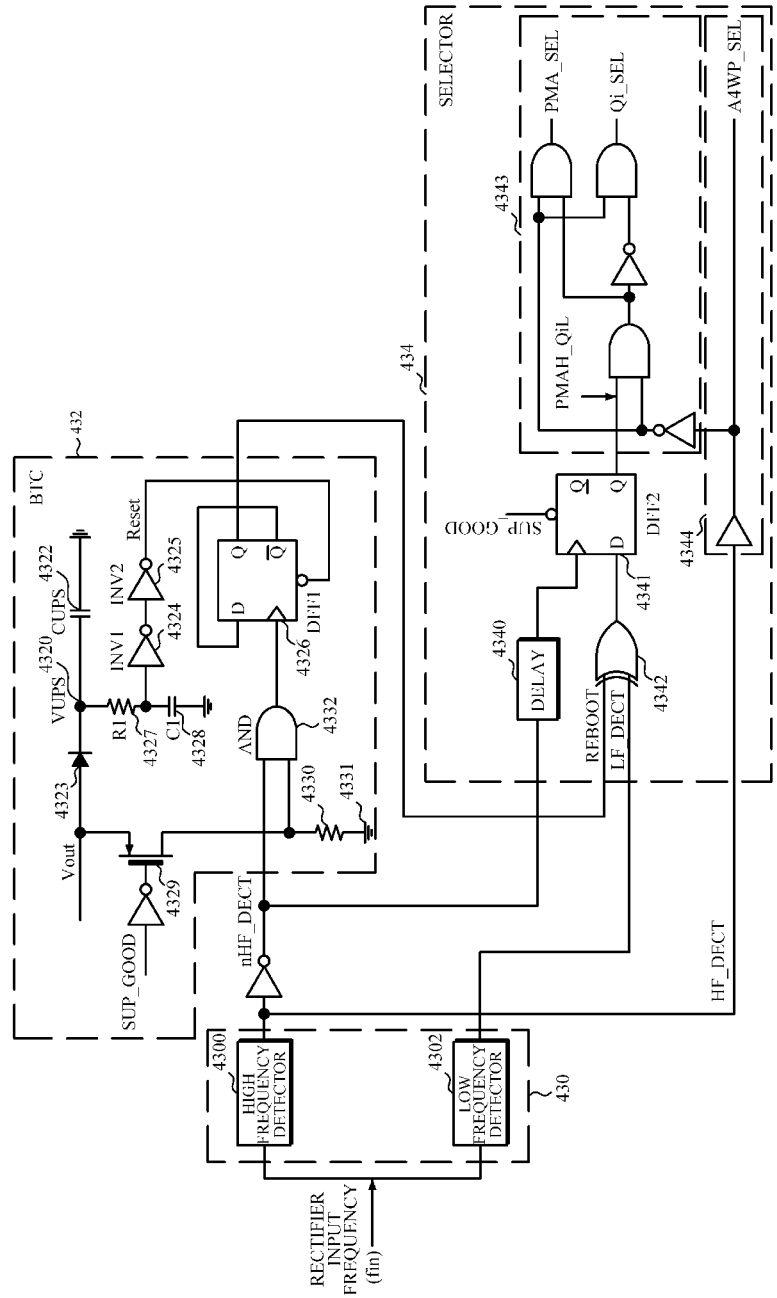
FIG. 5 is a detailed block diagram illustrating the wireless power transfer standard selector which is shown in FIG. 4 according to an embodiment of the present invention.

FIG. 5 is a detailed block diagram illustrating the wireless power transfer standard selector which is shown in FIG. 4 according to an embodiment of the present invention.

Referring to FIGS. 4 and 5, the FD 430 includes a high frequency detector 4300 and a low frequency detector 4302. The BTC 432 includes a VUPS node 4320, a capacitor CUPS 4322, a diode 4323, a first inverter INV1 4324, a second inverter INV2 4325, a first D flipflop DFF1 4326, a first resistor R1 4327, a first capacitor C1 4328, a transistor 4329, a second resistor R2 4330, a ground voltage 4331, and an AND logic circuit 4332. The selector 434 includes a delay 4340, a second D flipflop DFF2 4341, an XOR logic circuit 4342, a first circuit 4343, and a second circuit 4344.

The BTC 432 is constructed such that the transistor 4329 has a gate provided with an inversion signal of a status signal SUP_GOOD, which informs that a unit is normally operated by an output voltage Vout of the power conversion unit 24, a source provided with the output voltage Vout, and a drain to which the second resistor 4330 is connected. The second resistor 4330 is formed between the ground voltage 4331 and the transistor 4329. The capacitor CUPS 4322 is connected in series to an output voltage node to charge or discharge a voltage flowing through the output voltage node. The diode 4323 is located between the output voltage node and the capacitor CUPS 4322 and allows an output voltage to flow toward the capacitor CUPS 4322. The first resistor R1 4327 and the first capacitor C1 4328 are connected to the VUPS node 4320 formed between the diode 4323 and the capacitor CUPS 4322. The first inverter INV1 4324 is connected to the VUPS node 4320, and the second inverter INV2 4325 receives an output signal of the first inverter INV1 4324 and generates a reset signal. The AND logic circuit 4332 receives an inversion signal nHF_DECT of a high frequency detection signal HF_DECT and receives a signal generated from a node between the transistor 4329 and the second resistor 4330 and performs an AND operation on the received inversion signal nHF_DECT and the received signal generated from the node. The first D flipflop DFF1 4326 is reset by the reset signal of the second inverter INV 2 4325 and outputs a rebooting output signal REBOOT by receiving a clock signal generated from the AND logic circuit 4332.

The selector 434 is constructed such that the delay 4340 receives the inverted high frequency detection signal nHF_DECT from the BTC 432 and delays the inverted high frequency detection signal nHF_DECT. The XOR logic circuit 4342 receives the rebooting output signal REBOOT of the BTC 432 and a low frequency detection signal LF_DECT of the low frequency detector 4302 and performs an XOR operation on the received rebooting output signal REBOOT and the received low frequency detection signal LF_DECT.

The second D flipflop DFF2 4341 receives an output signal of the XOR logic circuit 4342 as a data signal, receives an output signal of the delay 4340 as a clock signal, and generates an output signal PMAH_QiL. The first circuit 4343 checks the output signal PMAH_QiL of the second D flipflop DFF2 4341 and selects a PMA protocol or Qi protocol. The second circuit 4344 receives and confirms a high frequency detection signal of the high frequency detector 4300 and selects the A4WP protocol.

Hereinafter, a process of selecting a wireless power transfer standard in the wireless power transfer standard selector will be described in detail.

An output voltage Vout is generated through the power conversion unit 24, and when the output voltage Vout is generated to a predetermined level, a status signal SUP_GOOD informing that the PRU is normally operated becomes a high state. The high frequency detector 4300 is configured to detect whether the rectifier input frequency fin corresponds to a frequency band of 6.78 MHz and allow an output thereof to become a high state when the rectifier input frequency fin is greater than or equal to 4 MHz. As such, when the rectifier input frequency fin is greater than or equal to 4 MHz, an output signal HF_DECT of the high frequency detector 4300 becomes a high state. In this case, the selector 434 selects the A4WP protocol, and an A4WP protocol selection signal A4WP_SEL becomes a high state, and both of Qi and PMA protocol selection signals become a low state.

Hereinafter, a process of selecting the Qi method and the PMA method will be described.

The low frequency detector 4302 allows an output signal LF_DECT to become a high state when the rectifier input frequency fin is less than or equal to 200 kHz. It may be assumed that power is received from a PTU that uses the PMA type 2 during a ping section, and an output voltage Vout increases and a status signal SUP_GOOD, which informs that the circuit normally operates, becomes a high state. Since the voltage of the capacitor CUPS 4322 of the 432 BTC is zero at the beginning and the diode 4323 between the output voltage Vout and the VUPS node 4320 allows a current to flow, the capacitor CUPS 4322 is charged almost to the output voltage Vout level. The first inverter INV1 4324, the second inverter INV2 4325, the first D flipflop DFF1 4326, and the AND logic circuit 4332 of the 432 BTC are elements that operate using the voltage of the VUPS node 4320 as a power voltage. When the VUPS node 4320 has no voltage, the voltage of the first capacitor C1 4328 is 0 V, and even when the voltage of the VUPS node 4320 increases, during a short period of time corresponding to a time constant of the first resistor R1 4327 and the first capacitor C1 4328 and a time constant of the first inverter INV1 4324 and the second inverter INV2 4325, an INV2 signal remains low and the first D flipflop DFF1 4326 is reset. That is, the output of the first D flipflop DFF1 4326 is reset to a low state. Accordingly, the output signal REBOOT remains in a low state. Under that above assumption that the PTU operates in the PMA type 2 method, the rectifier input frequency fin less than or equal to 4 MHz results in HF_DECT=L and nHF_DECT, i.e., inversion signal,=H. With SUP_GOOD=H and nHF_DECT=H, a clock pulse is applied to a clock input of the first D flipflop DFF1 4326 by the AND logic circuit 4332, and thus the state of the first D flipflop DFF1 4326 is changed. That is, the rebooting output signal REBOOT is changed from the low state to a high state. With REBOOT=H and LF_DECT=H, the output of the XOR logic circuit 4342 becomes a low state.

Due to the delay 4320 of the selector 434, a clock input of the second D flipflop DFF2 4341 receives nHF_DECT when a predetermined period of time is elapsed since nHF_DECT has become a high state, and thus the output of the XOR logic circuit 4342 is stored in the second D flipflop DFF2 4341. In this case, since the output of the XOR logic circuit 4342 is in a low state, the output of the second D flipflop DFF2 4341 becomes a low state, resulting in Qi_SEL=H. That is, the Qi protocol is selected. However, under the above assumption that the current PTU uses the PMA type 2 method, the communication is not smoothly performed, and thus the output voltage Vout is not maintained but disappears. However, the diode 4323 prevents the voltage of the VUPS node 4320 from being discharged, and thus the voltage of the VUPS node 4320 is maintained and the state of the first D flipflop DFF1 4326 does not disappear and is kept.

An output voltage Vout is generated again in the next ping section, resulting in SUP_GOOD=H. The output voltage Vout is an input having a frequency lower than 4 MHz and results in nHF_DECT=H, and thus a clock signal of the first D flipflop DFF1 4326 is generated, thereby causing the state of the first D flipflop DFF1 4326 to be changed. Since the first D flipflop DFF1 4326 stores a previous state of high, the output is changed to a low state by the newly applied clock signal. Accordingly, with REBOOT=L and LF_DECT=H, the output of the XOR logic circuit 4342 becomes a high state and the output of the second D flipflop DFF2 4341 becomes a high state. Accordingly, with PMA_SEL=H, the PMA protocol is selected and the communication in the second Ping is performed.

Figure 6:
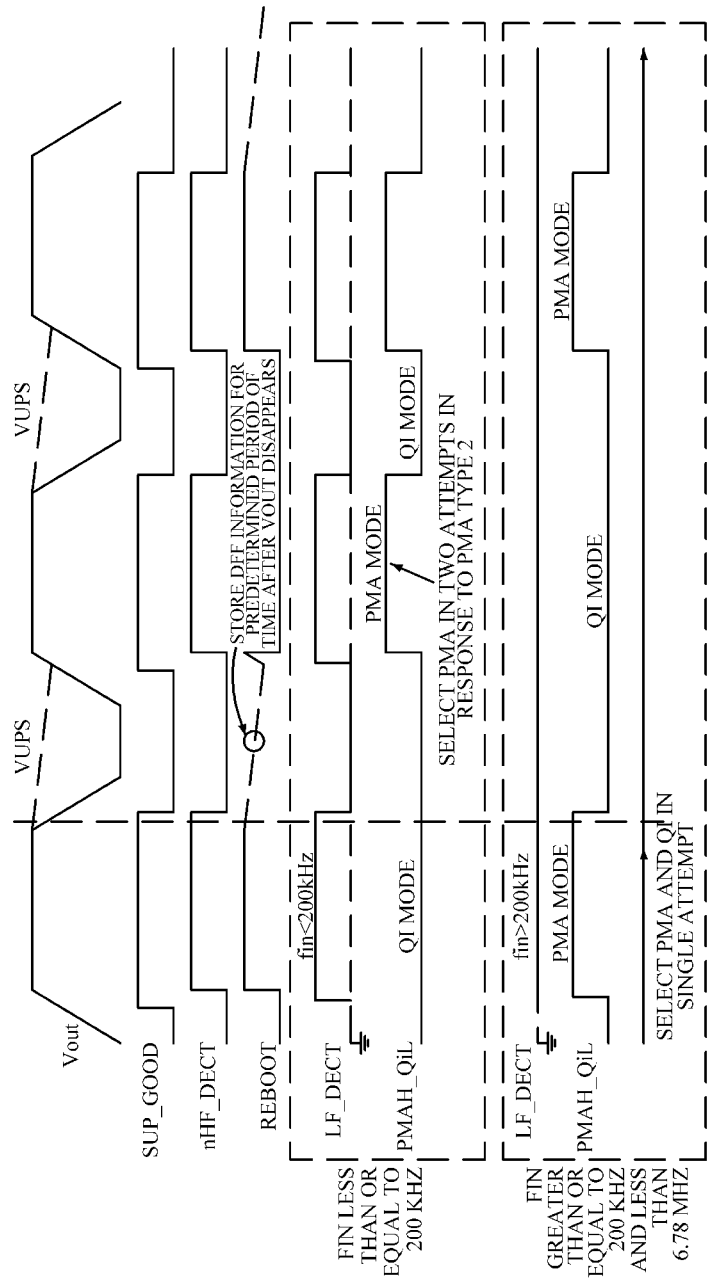
FIG. 6 is a signal timing diagram during operation of the wireless power transfer standard selector which is shown in FIG. 5 according to an embodiment of the present invention.

FIG. 6 is a signal timing diagram during operation of the wireless power transfer standard selector shown in FIG. 5 according to an embodiment of the present invention.

Referring to FIG. 6, when the communication fails in the first and the second attempts in a state of nHF_DECT=H due to the rectifier input frequency fin being less than or equal to 4 MHz, the Qi protocol and the PMA protocol are alternately selected so that the communication may be eventually established. To summarize, the communication may succeed according to the following attempts.

(1) A case in which power is supplied from the Qi PTU: communication succeeds in a single attempt.
(2) A case in which power is supplied from the PMA type 1 PTU: communication succeeds in a single attempt.
(3) A case in which power is supplied from the PMA type 2 PTU: communication succeeds in two attempts.
(4) A case in which power is supplied from the A4WP PTU: communication succeeds in a single attempt.

That is, with all the PTUs except for the PMA type 2, communication succeeds in a single attempt. When a communication fails, in particular, in a low frequency operation, the Qi protocol and the PMA protocol are alternately selected automatically so that the communication eventually succeeds. Since most PMA PTUs currently put on the market use the PMA type 1 method, it should be considered that the communication may succeed in a single attempt in relation to the three types of wireless communication PTUs.

Although the exemplary embodiments of the present invention have been described for illustrative purposes, those skilled in the art should appreciate that various modifications, additions, and substitutions are possible without departing from the scope and spirit of the present invention. Therefore, the exemplary embodiments of the present invention have been described for illustrative purposes and not for limiting purposes. Accordingly, the scope of the present invention is not to be limited by the above embodiments but by the claims and the equivalents thereof.

The invention claimed is:

1. A wireless power transfer standard selector of a power receiving unit, comprising: a frequency detector configured to detect an input frequency of a rectifier; a booting trial counter configured to count a number of booting times in which an output voltage of a power converter is generated and disappears, and to store the counted number of booting times; and
a selector configured to select a wireless power transfer standard method by using the detected input frequency and the counted number of booting times,
wherein the selector is further configured to:
primarily select a Qi protocol or a Power Matters Alliance (PMA) type 2 protocol as a protocol for communication with a wireless power transmitter transmitting power in a wireless manner through an antenna when the detected input frequency is less than or equal to 200 kHz;
in response to selecting the Qi protocol in the primary selection, finally select the Qi protocol when the counted number of booting times is one, and finally select the PMA type 2 protocol when the counted number of booting times is two; and
in response to selecting the PMA type 2 protocol in the primary selection, finally select the PMA type 2 protocol when the counted number of booting times is one, and finally select the Qi protocol when the counted number of booting times is two.

2. The wireless power transfer standard selector of claim 1, wherein the frequency detector includes:
a high frequency detector configured to detect a rectifier input frequency of a high frequency; and
a low frequency detector configured to detect a rectifier input frequency of a low frequency.

3. The wireless power transfer standard selector of claim 1, wherein the booting trial counter is further configured to store the counted number of booting times for a predetermined period of time even after the output voltage disappears.

4. The wireless power transfer standard selector of claim 1, wherein the selector is further configured to select an Alliance for Wireless Power (A4WP) protocol as a protocol for communication with a wireless power transmitter when the detected input frequency is greater than or equal to 6.78 MHz.

5. The wireless power transfer standard selector of claim 1, wherein the selector is further configured to select a Power Matters Alliance (PMA) type 1 protocol as a protocol for communication with a wireless power transmitter when the detected input frequency is greater than or equal to 200 kHz or less than 6.78 MHz.

6. The wireless power transfer standard selector of claim 1, wherein the selector is further configured to:
primarily select the Qi protocol as a protocol for communication with the wireless power transmitter when the detected input frequency is less than or equal to 200 kHz and the counted number of booting times is one; and
finally select the Qi protocol when a communication primarily initiated through the Qi protocol succeeds, and finally select the Power Matters Alliance (PMA) type 2 protocol when a communication primarily initiated through the Qi protocol fails and a rebooting is performed.

7. A wireless power transfer standard selector of a power receiving unit, comprising:
a frequency detector configured to detect an input frequency of a rectifier; a booting trial counter configured to count a number of booting times in which an output voltage of a power converter is generated and disappears, and to store the counted number of booting times; and
a selector configured to select a wireless power transfer standard method by using the detected input frequency and the counted number of booting times,
wherein the booting trial counter includes:
a transistor having a gate provided with an inversion signal of a status signal, which indicates the power receiving unit is normally operated by an output voltage of the power conversion unit, a source provided with an output voltage signal, and a drain to which a second resistor is connected; the second resistor formed between a ground voltage and the transistor; a capacitor connected to an output voltage node to charge or discharge a voltage flowing through the output voltage node; a diode located between the output voltage node and the capacitor such that an output voltage flows to the capacitor; a first resistor and a first capacitor that are connected to a node formed between the diode and the capacitor; a first inverter connected to the first resistor and the first capacitor; a second inverter configured to generate a reset signal by receiving an output signal of the first inverter; an AND logic circuit configured to receive an inverted high frequency detection signal, receive a signal generated from a node between the transistor and the second resistor, and perform an AND operation on the inverted high frequency detection signal and the signal generated from the node; and a first D flipflop configured to be reset by the reset signal of the second inverter and output a rebooting output signal by receiving a clock signal generated from the AND logic circuit.

8. A wireless power transfer standard selector of a power receiving unit, comprising:
a frequency detector configured to detect an input frequency of a rectifier; a booting trial counter configured to count a number of booting times in which an output voltage of a power converter is generated and disappears, and to store the counted number of booting times; and
a selector configured to select a wireless power transfer standard method by using the detected input frequency and the counted number of booting times,
wherein the booting trial counter includes:
a delay configured to receive an inverted high frequency detection signal from the frequency detector and delay the inverted high frequency detection signal; an XOR logic circuit configured to receive a rebooting output signal from the booting trial counter and a low frequency detection signal from the frequency detector, and perform an XOR operation on the received rebooting output signal and the received low frequency detection signal; a second D flipflop configured to receive an output signal of the delay as a clock signal and an output signal of the XOR logic circuit as a data signal, and generate an output signal; a first circuit configured to check the output signal generated by the second D flipflop and select a PMA protocol or a Qi protocol; and a second circuit configured to receive and confirm a high frequency signal from the frequency detector and select the A4WP protocol.

* * * * *